Nov. 13, 1962  H. E. REEDER, JR  3,064,122
NIGHT FISHING DEVICE
Filed Oct. 13, 1960  2 Sheets-Sheet 1

INVENTOR.
HARRY E. REEDER JR.
BY
ATTORNEY

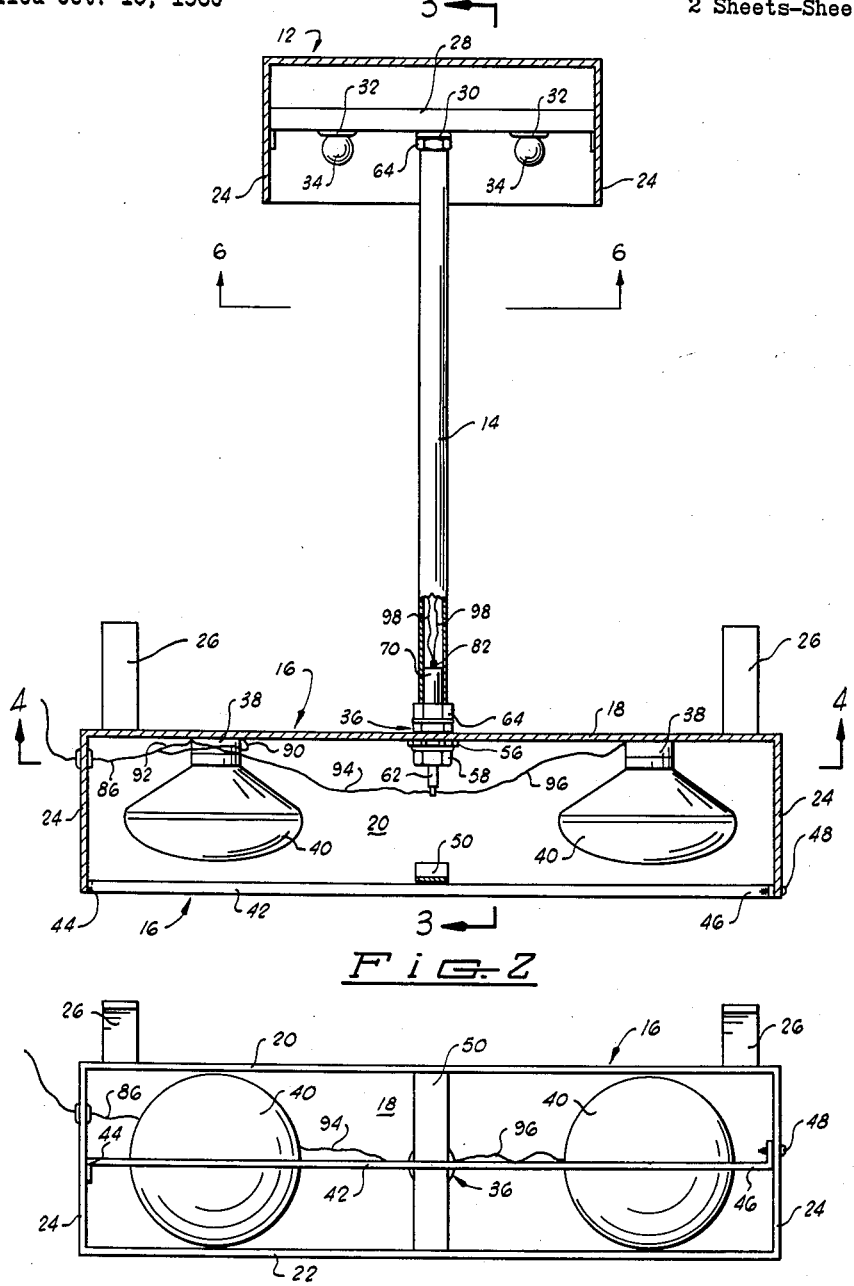

United States Patent Office 3,064,122
Patented Nov. 13, 1962

3,064,122
NIGHT FISHING DEVICE
Harry E. Reeder, Jr., 4100 N. Reeder Ave.,
Oklahoma City, Okla.
Filed Oct. 13, 1960, Ser. No. 62,352
6 Claims. (Cl. 240—7.5)

The present invention relates to a device employed in night fishing operations, and more particularly, but not by way of limitation, to a lamp for utilization in night fishing for the purpose of illuminating the fishing operations, and also for attracting the fish to the area of such fishing operations.

In the sport of game fishing at night, as well as in commercial fishing operations, it is well-known that the success of the night fishing operation is enhanced by utilizing a source of light for the purpose of attracting the fish to the area where the bait and hooks are located. Although the devices which have been utilized to provide the required source of light have worked well enough when once installed in position, several disadvantages have generally characterized such devices which frequently make their use impractical or less attractive. Thus, many of the lighting devices which are used are not designed primarily for the purpose of night fishing, and must be secured in position upon the boat or dock from which the fishing operation is to be conducted by means of improvised or jury-rigged attachments. This, of course, constitutes a time-consuming operation and also frequently results in the irretrievable loss of the expensive lighting equipment into the water. Moreover, it is also sometimes difficult to secure the light properly by such temporary means of attachment, and the light beam is not directed in the most desirable spot.

Another inadequacy of previous types of night fishing lamps has been due to the fact that the light bulbs or lamps provided in such devices have constituted but a single source of light, making it necessary to shift the light away from the area of water which it is desired to illuminate in order to utilize it to light portions of the boat or dock during rebaiting or other operations incidental to the usual fishing procedure. Also, the provision of but a single source of light has the undesirable result of tending to blind the fisherman with respect to all areas except that which is illuminated so that a high degree of difficulty is experienced in carrying out other visual functions than that of merely observing the small area which can be illuminated at any one time.

Applicant is aware of at least two previous types of night fishing lights which are built into, or made an integral part of, the boat from which the fishing operations are being conducted. Such fishing lights obviously have the disadvantage of being relatively stationary, that is, they cannot be transported to and from the fishing area without also transporting the boat to which they are secured. In other types of fishing lights with which applicant is familiar, the light is intended to be portable and usable upon the several types of structures from which the fishing operations may be conducted, but is in reality cumbersome to carry and quite bulky in overall configuration, making storage with other fishing equipment in an automobile or boat difficult.

The present invention contemplates a novel lamp for utilization in night fishing which overcomes many of the disadvantages and difficulties of use which have characterized night fishing lamps of previous construction. Thus, the fishing lamp of the present invention provides not only the usual powerful light source which is utilized to illuminate the water to a considerable depth for the purpose of attracting the fish, but also is characterized by a conveniently located second source of light which is of reduced intensity and which functions to adequately illuminate the interior of the boat or the area of the dock where the fisherman's tackle is located. The construction of the novel fishing lamp of this invention is such that the complete device may be quickly disassembled into relatively small parts to permit the device to be stored and transported in a small space. The device in its assembled form carries means for quickly and easily attaching or detaching the device to or from the gunwale of a boat carrying the fisherman, or a dock, as the case may be.

In its broader aspects, the night fishing lamp of the present invention may be said to comprise a pair of large, relatively powerful sources of light enclosed in a lower shade for directing the light produced thereby downwardly into the water, a vertical standard quick-detachably connected to the top of the lower shade and extending upwardly therefrom, an upper shade secured to the top of the vertical standard, and a pair of small lights located in the upper shade for illuminating the interior of the boat, or the area of the dock surrounding the fisherman. The lower shade carries a pair of clips which permit the entire device to be quickly secured to the boat or dock where it is to be utilized. For the purpose of disassembling the device for storage and transport, the vertical standard may be disconnected from the upper and lower shades, and the parts so resulting may be stored in a relatively small compact space. The present invention is also designed to operate efficiently upon a relatively low voltage, and is characterized by a simple electrical circuit which has a relatively long life and is easily repaired if this becomes necessary.

It is a major object of the present invention to provide a night fishing lamp which may be quickly and easily secured to the gunwale of a boat or to a dock, and which may be disassembled upon conclusion of the fishing operation for storage and transportation in a relatively small space.

It is a further object of the present invention to provide a night fishing lamp which is characterized by a first source of low intensity light which is provided for the purpose of illuminating the immediate area surrounding the fisherman and a second source of relatively high intensity light which is directed down into the water for the purpose of attracting fish.

An additional object of the present invention is to provide a night fishing lamp in which the sources of light utilized in the lamp are easily installed and replaced when necessary.

A further object of the present invention is to provide a night fishing light which may be operated upon the power supplied by a storage battery and which is characterized by a relatively simple and easily accessible electrical circuit.

An additional object of the present invention is to provide a night fishing lamp which is of rugged construction and which is characterized by a long and trouble-free operating life, is inexpensive to manufacture, and it is considerably more versatile and utilitarian than lights which have been previously used for the purpose of night fishing.

These objects and advantages will be better understood, and additional objects and advantages will become apparent from a further reading of the specification in conjunction with a perusal of the accompanying drawings which illustrate my invention.

In the drawings:

FIGURE 2 is an elevational view of the fishing lamp with the front sides of the upper and lower shades removed and a portion of the vertical standard broken away to better illustrate certain elements of the invention.

FIGURE 5 is a plan view of the fishing lamp as it appears when viewed from directly below the lower shade.

Figure 1:
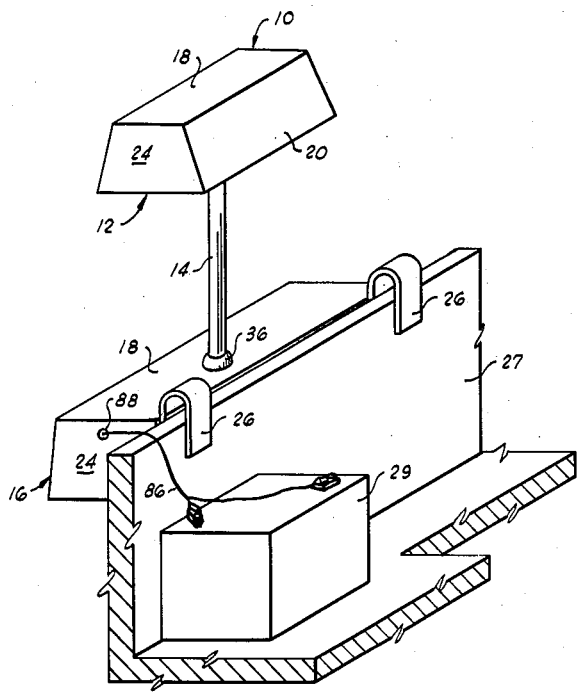
FIGURE 1 is a perspective view of the night fishing lamp of the present invention as it is attached to the gunwale of a boat and is supplied with electrical power from a storage battery carried in the boat.
Figure 4:
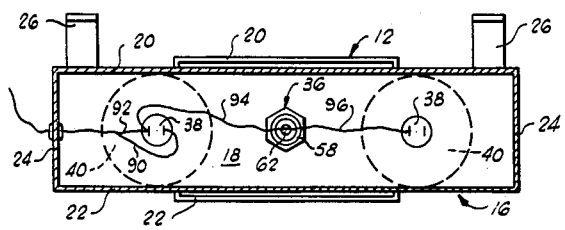
FIGURE 4 is a sectional view taken along lines 4—4 of FIG. 2 with the front sides of the upper and lower shades in place.
Figure 6:
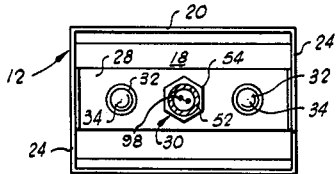
FIGURE 6 is a sectional view taken along lines 6—6 of FIG. 2 with the front side of the upper shade in place.

Referring now to the drawings in detail, and particularly to FIG. 1, the night fishing lamp of the present invention is designated generally by reference character 10. The fishing lamp 10 comprises an upper shade 12 of generally trapezoidal cross section, a vertical standard 14 and a lower shade 16 of generally trapezoidal cross section. Both the upper and lower light shades 12 and 16, respectively, include a top 18, a back 20, a front 22 and a pair of ends 24. Suitable means are secured to the back side 20 of the lower shade 16 for the purpose of attaching or securing the night fishing lamp to a boat or dock and, as depicted in the preferred embodiment of FIG. 1, may conveniently comprise a pair of generally U-shaped clips 26 secured at each end of the back side 20 of the lower shade 16. In FIG. 1, the U-shaped clips are clipped over the gunwale 27 of the boat so that the lower shade 16 abuts the side of the boat and extends generally parallel to the surface of the water. A storage battery 29 is carried in the boat and is utilized to supply the electrical power required to operate the fishing lamp 10.

Figure 3:
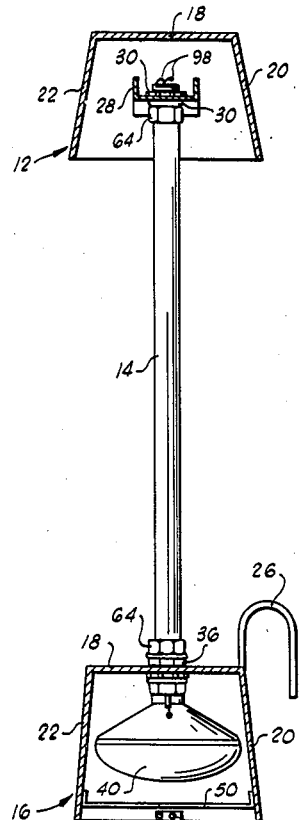
FIGURE 3 is a sectional view taken along lines 3—3 of FIG. 2 with the vertical standard of the lamp illustrated in elevation.

As shown in FIGS. 2 and 3, the upper shade 12 and the lower shade 16 each carry a pair of light sources of the incandescent type. In the upper shade 12, a longitudinally extending cross member 28 of generally U-shaped cross section is secured at each of its ends to the ends 24 of the upper shade. The cross member 28 is provided with a centrally located coupling 30 and with a pair of sockets 32 for the accommodation of a pair of small light bulbs 34 of low wattage. Any type of suitable light socket 32 may be employed in the cross member 28, but I prefer to utilize a bayonet-type socket so that the bulbs 34 may be quickly and easily inserted in the socket by simply pushing them into the sockets and turning them approximately one-half revolution. The vertical standard 14 is a tubular member and is connected at its upper end to the coupling 30 and at its lower end to another coupling 36 which is centrally located upon the top 18 of the lower shade 16.

Secured to the inner surface of the top 18 of the lower shade 16 are a pair of sockets 38 of a size and design suitable for the accommodation of a pair of large seal-beam lights 40 of the type generally utilized in automobiles. A longitudinal cross member 42 extends across the bottom of the lower shade 16 and is secured at its opposite ends to the ends 24 of the shade. Although the cross member 42 may be secured to the ends 24 of the lower shade 16 in any suitable manner, I prefer to spot-weld one end 44 of the cross member 42 to one end 24 of the lower shade 16 and to detachably secure the opposite end 46 of the cross member 42 to the shade 16 by means of a screw or bolt 48. This construction, illustrated in FIG. 5, allows the longitudinal cross member 42 to be swung aside from its central position to permit the seal-beam lights 40 to be quickly and easily inserted in their sockets 38. The longitudinal cross member 42 may then be returned to, and secured in, its central position to prevent the loss of the lights 40 into the water below the shade should they become accidentally disengaged from their sockets 38. The lower shade 16 is also provided with an additional cross member 50 which extends transversely across the shade and is secured at its ends to the lower sides of the front and back 22 and 20, respectively, of the lower shade 16. The transverse cross member 50 is disposed above the longitudinal cross member 42 in order to permit the latter to be swung clear of the front and back of the shade when it is desired to install or replace the seal-beam lights 40.

Figure 7:
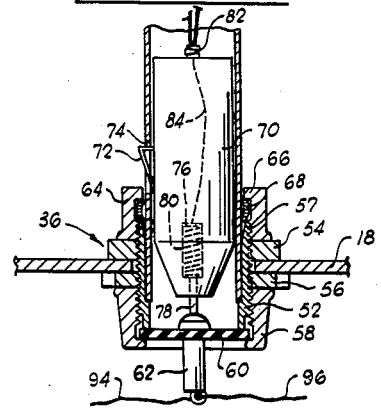
FIG. 7 is a partial sectional view through the vertical standard which spaces the two lamp shades of the present invention from each other. The section is taken parallel to the axis of the vertical standard at a point where the standard is connected to the lower shade with the contact plug which is located in the vertical standard being shown in elevation.

The manner in which the vertical standard 14 is quick-detachably connected at its lower end to the lower shade 16 and at its upper end to the upper shade 12 is best illustrated in FIGS. 2, 3 and 7. The couplings 30 and 36 secured to the cross member 28 of the upper shade 12 and to the top 18 of the lower shade 16, respectively, are identical. Each of the couplings 30 and 36 comprises an externally threaded tubular member 52 which extends through the respective top 18 of the lower shade 16, or cross member 28 of the upper shade 12, as the case may be, and a pair of internally threaded retaining washers 54 and 56 which are threaded upon the tubular member 52 to retain the tubular member in fixed position relative to the shades in the manner illustrated in FIG. 7. The externally threaded tubular member 52 is positioned with respect to the top 18 of the lower shade 16 so that the threaded end portions thereof project approximately equidistantly on each side of the top 18. The same relative positioning with respect to the cross member 28 of the upper shade 12 characterizes the tubular member 52 of the upper coupling 30. As indicated by reference character 57, the ends of the tubular members 52 adjacent the vertical standard 14 are tapered outwardly from the inner periphery to provide an end of wedge-like configuration.

The upper coupling 30 is open at both its ends for a purpose hereinafter to be explained. The lower coupling 36, however, is closed at its lower end inside the lower shade 16 by means of a collar 58 and a disc 60 as shown in FIG. 7. The disc 60 carries an electrical contact 62 which is exposed upon each side of the disc 60.

As has been previously explained, the vertical standard 14 is preferably tubular in shape. The outside diameter of the tubular vertical standard 14 is slightly less than the inside diameter of the tubular members 52 used in the upper and lower couplings 30 and 36, respectively, so that the vertical standard may be telescoped into the tubular members 52. A pair of internally threaded, annular sleeves 64 are positioned around the vertical standard for sliding movement therealong, and each of the sleeves 64 is of a size to threadedly engage the tubular members 52 of the upper and lower couplings 30 and 36, respectively. The sleeves 64 are each provided with an inwardly extending circumferential flange 66 at their adjacent ends. A constrictable washer 68 is disposed around the vertical standard 14 between the inner periphery of each of the sleeves 64 and the outer periphery of the vertical standard.

A generally cylindrical plug 70 constructed of electrically non-conductive material is pressed into the lower end of the tubular vertical standard 14 and forms a fairly tight frictional fit therein. In a preferred embodiment of the invention, the plug 70 is provided with a resilient protuberance 72 which mates with a slot 74 in the vertical standard 14 (see FIG. 7). The plug 70 may thus be inserted in the lower end of the vertical standard 14 by depressing the resilient protuberance 72, forcing the plug into the open end of the standard, and then allowing the protuberance to snap outwardly into the slot 74. This arrangement permits the plug to be securely retained in position in the lower end of the vertical standard 14 and to be quickly and easily removed therefrom when replacement or repair is necessary.

The plug 70 is provided with an axial, inwardly extending recess 76 at its lower end, and an electrical contact 78 is fitted in the recess 76 and protrudes from the lower end of the plug. A compression spring 80 is fitted in the recess 76 between the bottom thereof and the contact 78, and yieldingly urges the contact downwardly toward the end of the plug 70. An additional electrical contact 82 is secured to the top of the plug 70 and is connected to the compression spring 80 by means of an electrical lead 84.

The electrical circuitry of the present invention is best illustrated in FIGS. 1, 2, 4 and 7. As has previously been indicated, the source of electrical power may conveniently comprise a storage battery 29, as shown in FIG. 1. The leads from the storage battery are encased in a common electrically insulating sheath 86 and are passed through an opening 88 in one end 24 of the lower shade 16. Inside the shade 16 the electrical leads from the two battery terminals again emerge from the insulating sheath 86 and one of the leads 90 is grounded to the lower shade 16. The second lead 92, which will hereinafter be termed the "hot lead," is connected to the socket 38 of the first seal-beam light 40. A hot lead 94 is connected to the hot lead 92 and to the electrical contact 62 carried by the disc 60 at the lower end of the coupling 36. Hot lead 96 connects the contact 62 to the socket 38 of the second seal-beam light 40 and makes, with the ground path through the lower shade 16, a complete electrical circuit.

One leg of the electrical circuit to the small light bulbs 34 provided in the upper shade 12 is comprised of the lower shade 16, the vertical standard 14 and the upper shade 12, each of which is constructed of electrically conducting material and thus provides continuity of conductance between the point where the ground lead 90 is grounded to the lower shade 16 and the small bulbs 34 carried in the upper shade 12. The other leg of the circuit is constituted by the hot lead 94, the electrical contact 62, the electrical contact 78, the compression spring 80, electrical lead 84, electrical contact 82, and a pair of electrical leads 98 which extend from the electrical contact 82 upwardly through the tubular vertical standard 14 and across the U-shaped cross member 28 to each of the sockets 32.

Operation

To assemble the several parts of the night fishing lamp of the present invention, the vertical standard 14 is first connected to the lower shade 16 by means of the lower coupling 36. The tubular vertical standard 14 is inserted in the tubular member 52 and the internally threaded sleeve 64 is threaded downwardly upon the externally theaded tubular member 52. When the sleeve 64 is tightened upon the tubular member 52, the outwardly tapered upper end 57 of the tubular member 52 is wedged between the inner wall of the sleeve 66 and the constrictable washer 68 to force the washer into tight frictional engagement with the outer periphery of the vertical standard 14. In this manner, the vertical standard is tightly connected to the lower shade 16 with the electrical contact 78 carried by the plug 70 biased into abutting contact with the electrical contact 62 by the compression spring 80. The upper shade 12 is then secured to the upper end of the vertical standard 14 by means of the coupling 30 which is identical to the lower coupling 36, and the second internally threaded sleeve 64 which is identical to the internally threaded sleeve 64 disposed at the lower end of the vertical standard 14. If it is found convenient to transport the night fishing light of the present invention as three separate elements, it is preferable to provide a second electrical plug 70 identical to the plug 70 disposed at the lower end of the vertical standard 14 for establishing the electrical circuit between the leads from the small bulbs 34 in the upper shade 12 to the leads 98 extending upwardly inside the vertical standard.

When the night fishing light has been assembled, it may be mounted upon the gunwale of a fishing boat as illustrated in FIG. 1, or it may be secured in any appropriate manner to a dock or pier. In referring to FIG. 1, it will be readily apparent that one of the important features of the present invention is the provision of a night fishing light which permits a relatively strong, intense light to be directed downwardly into the water for the purpose of attracting fish, and a second, less intense light elevated above the first light and positioned to afford adequate illumination to the area immediately surrounding the fisherman in order that such manipulations as rebaiting, stringing fish, selecting plugs, etc., may be effectively carried on. The design of the upper and lower shades 12 and 16, respectively, assures that the light produced by the seal-beam lights 40 and the small bulbs 34 will not blind the fisherman. Upon the completion of the fishing operation, the fishing light may be quickly and easily detached from the boat or other structure upon which it is mounted, and may be quickly disassembled into its several parts for storage or transportation in a relatively small space.

From the foregoing, it will be apparent that the present invention provides a valuable aid to the fisherman engaged in night fishing operations. The light is inexpensive to manufacture and is of strong, durable construction with a simplified electrical circuit which is not subject to frequent malfunction or shorting out. The light may be easily transported from the home to the fishing area without occupying excessive space and may be easily assembled and disassembled prior to, and after each use. The seal-beam lights 40 and the small bulbs 34 are quickly and easily installed or renewed, and the cross members 50 and 42 of the lower shade 16 assure that the seal-beam lights 40 cannot be inadvertently lost in the water during the fishing operations.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

I claim:

1. A lamp for use in night fishing comprising a first light source; a first shade of electrically conducting material around, and in electrical contact with, said first light source for directing light from said first light source into the water adjacent the boat; means for supporting said lamp on a boat; a tubular member of electrically conducting material extending generally vertically from said first shade; a first tubular externally threaded coupling projecting upwardly from the center of said first shade around the lower end of said tubular member; a second shade of electrically conducting material connected to the top of said tubular member; a second light source in said second shade in electrical contact therewith for illuminating the interior of said boat; a source of electromotive force having a pair of electrical terminals; a ground lead from one of said terminals to said first shade; an electrical contact secured in said tubular coupling; a hot lead connected from the other of said terminals to said first light source and to said contact; resilient electrical contact means frictionally retained in said tubular member adjacent its lower end and yieldingly bearing against said electrical contact; a first internally threaded sleeve disposed slidably around said tubular member and threadedly engaging said coupling; an annular lock ring inside said first sleeve and forced by said first coupling into tight frictional engagement with said tubular member; and an electrical lead connected at one end to said resilient electrical contact means, extending up through said tubular member, and connected at its other end to said second light source.

2. A night fishing device as claimed in claim 1 wherein said resilient electrical contact means comprises a generally cylindrical plug of a size to permit said plug to be pressed into said tubular member with a tight frictional fit, said plug defining an axial recess originating at one end thereof; a first electrical contact mounted in said recess for axial movement therein and extending out of said recess beyond the adjacent end of said plug; an electrically conducting compression spring in said recess between the bottom thereof and said first electrical contact whereby said spring constantly urges said electrical contact toward the origin of said recess; a second electrical contact secured to said plug at the opposite end thereof from said axial recess; and an electrically conducting lead connecting said spring to said second electrical contact.

3. A night fishing device as claimed in claim 1 wherein the connection between said tubular member and said second shade comprises a second tubular, externally threaded coupling centrally attached to said second shade, said coupling receiving said tubular member in telescoped relation therein; a second internally threaded sleeve disposed concentrically around said tubular member and slidable relative thereto, said second sleeve threadedly engaging said second coupling; and an annular lock ring inside said first sleeve and adapted to be forced by said coupling into tight frictional engagement with said tubular member when said first sleeve is threaded upon said coupling.

4. A lamp for use in night fishing comprising a first shade having a top, two ends, a front side and a back side; a pair of U-shaped clips secured to the back side of said first shade for supporting said lamp on the gunwale of a boat; a pair of incandescent lights horizontally spaced from each other in said first shade; a longitudinal cross-member flexibly secured at one of its ends to the lower portion of one of the ends of said first shade and detachably secured at the other of its ends to the lower portion of the other end of said first shade; and a transverse cross-member centrally located in said first shade above said longitudinal cross-member and secured at its ends to the lower portion of said front and back sides of said first shade; a generally vertical standard connected at its lower end to said first shade; a second shade connected to the top of said generally vertical standard; and a source of light located in said second shade for illuminating the boat to which said lamp is attached.

5. A lamp for use in night fishing comprising a first shade enclosing a first source of light; clip means on said shade and cooperating with said shade to position said shade on the gunwale of a boat and parallel to the surface of the water; means pivotally attached to said first shade for retaining said first source of light in said first shade against inadvertent displacement therefrom and loss in the water; a generally vertical standard detachably connected at its lower end to said first shade; a second shade detachably connected to the top of said generally vertical standard; and a source of light located in said second shade for illuminating the boat to which said lamp is attached.

6. A lamp for use in night fishing as claimed in claim 5 wherein said first shade is opaque and of a configuration such that light from said first source of light is directed vertically downward and is shielded from direct view by a fisherman in said boat; and further characterized to include a pair of threaded sleeves slidably retained around said standard; and a threaded coupling on each of said first and second shades engaging said threaded sleeves for quick-detachably securing said shades at opposite ends of said standard whereby said lamp may be disassembled into three parts when not in use for ease of transport.

References Cited in the file of this patent

UNITED STATES PATENTS

| | | |
|---|---|---|
| 1,663,357 | Stefan | Mar. 20, 1928 |
| 1,966,485 | Chanock | July 17, 1934 |
| 1,973,152 | Ryan | Sept. 11, 1934 |
| 2,000,743 | Cohen | May 7, 1935 |
| 2,277,357 | Sauer | Mar. 24, 1942 |
| 2,421,057 | Dunkelberger | May 27, 1947 |
| 2,790,894 | Zingone | Apr. 30, 1957 |